R. E. KLETT.
COLORIMETER.
APPLICATION FILED AUG. 25, 1920.

1,375,708.

Patented Apr. 26, 1921.

Inventor
Robert E. Klett
By his Attorney

UNITED STATES PATENT OFFICE.

ROBERT E. KLETT, OF RIDGEFIELD PARK, NEW JERSEY.

COLORIMETER.

1,375,708.  Specification of Letters Patent.  Patented Apr. 26, 1921.

Application filed August 25, 1920. Serial No. 405,857.

*To all whom it may concern:*

Be it known that I, ROBERT E. KLETT, a citizen of the United States, and a resident of Ridgefield Park, in the county of Bergen and State of New Jersey, have invented certain new and useful Improvements in Colorimeters, of which the following is a specification.

This invention relates to colorimeters, and has for its object to simplify and cheapen the cost of manufacturing such devices, while maintaining the desired accuracy of reading required in such devices.

According to this invention, I provide a stand carrying the standard solution container and mount the unknown solution container on a support preferably carried by an eye piece sliding on the stand, so that comparisons are quickly made. I find that the standard tube can be made of ordinary glass tubing, such as a test tube, diagonally cut away to give variation of depth, and fused or otherwise secured to a translucent or transparent back, with a diaphragm interposed between the eye piece and the tube to obtain a narrow vertical band of color, uniformly varying in intensity with the depth of the diagonal cut away tube. The unknown solution is placed adjacent the standard solution and also between the translucent or transparent back and another slot in the diaphragm, but moves up and down with the eye piece in making the measurement. By thus making the test solution container movable, the amount of solution required is reduced to a minimum, as the solution need only be deep enough to cover the field of the eye piece. The eye piece may consist of prisms arranged to bring the respective bands of colored light from the diaphragm into proper focus with the objective, so that measurements are made by putting the known and unknown solution into the respective tubes and then simply moving the eye piece up or down until the bands of color therein appear equal in intensity, whereupon the reading is made from a scale on the stand.

Figure 1:
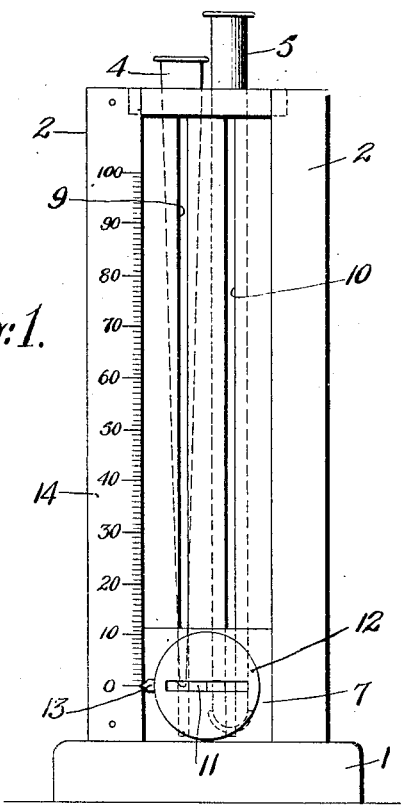
Figure 2:
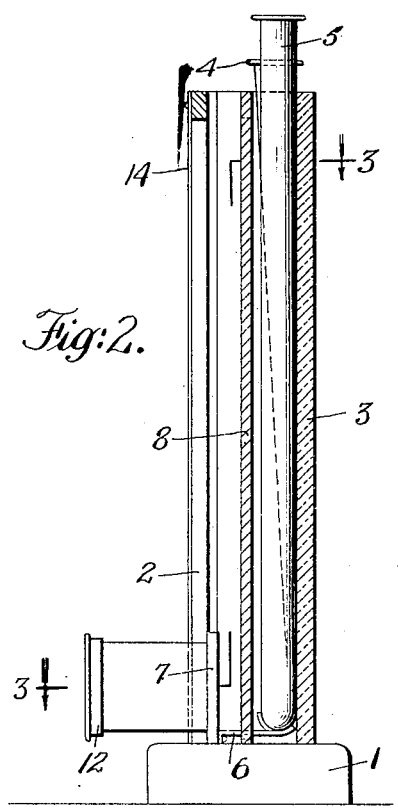
Figure 3:
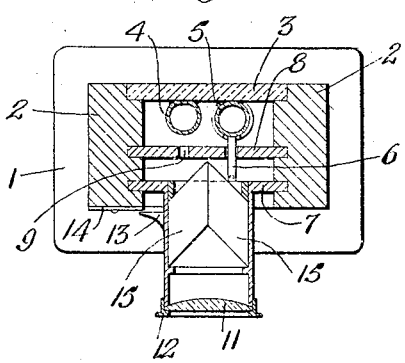

In the accompanying drawings,

Figure 1 is an elevation,

Fig. 2 a side view,

Fig. 3 a section on a line 3—3 of Fig. 2, and

Figure 4:

Fig. 4 is a detail of the novel standard container.

1 represents the stand provided with separated uprights 2—2. Carried by up-rights 2—2 is the transparent, translucent, or opalescent back 3 and fused thereto is a diagonally cut tube 4 to form a column of uniformly varying width. Translucent or opalescent glass is preferable for the back 3 as compared with transparent glass to diffuse the light and break up images from distant objects. The novel construction of standard tube consisting of the diagonally cut tube fused to the back 3 is of particular advantage here because of simplicity in manufacture and providing only one joint.

I am aware of wedges built up of as many as seven different pieces, which are objectionable not only because of possible errors but because of the large volume of liquid necessary; as these wedges cannot be made small. This is very important as in blood determination only a few drops of blood are necessary, which can easily be taken from the finger or ear of the patient; while with the relatively large wedges before known the opening of a vein is the only way to obtain sufficient material. To this the physician as well as the patient objects.

Adjacent the standard wedge tube 4 is the tube 5 for the unknown solution, which may be an ordinary laboratory test tube. This tube is supported by an arm 6 carried by the eye piece slide 7, the arm 6 extending through the diaphragm 8 having slots 9, 10, to produce narrow bands of light. The purpose of making tube 5 movable is to render unnecessary the use of large quantities of the unknown solution. Tube 5 need not be filled, only enough solution being required to cover the field of the eye piece, and tube 5 may, if desired, be made only large enough to contain this amount of solution. The slide 7 carries prisms 15 so disposed as to bring the light rays from slots 9—10, in conjunction through objective 11, which is covered by the end cap 12, except for the slot 17. By suitable design of the prisms it will be seen that the bands can be brought the desired distance apart from the best comparisons.

It is thought that the operation will be understood without further description, it being seen that the pointer 13 carried by the eye piece slide moves over the scale 14 and one of the up-rights 2, giving the ratio.

Various modifications and changes may be made without departing from the scope of the appended claims.

I claim:

1. A colorimeter comprising a stand carrying a stationary diaphragm having longitudinal slots, a standard solution tube comprising a light transmitting plate having a diagonally cut tube fused thereto along its cut portion so as to provide a longitudinal section of varying thickness, located behind one slot, an unknown solution tube behind the other slot, an eye piece, and means for bringing the beams from said two tubes adjacent each other at the eye piece.

2. A colorimeter comprising separated uprights carrying a sliding eye-piece, a diaphragm back of the eye piece having parallel slots, a standard tube behind one slot composed of a flat plate having a diagonally cut tube secured thereto along its cut portion so as to provide a longitudinal section of varying thickness, and a tube for the unknown solution behind the other slot.

3. A colorimeter comprising separated uprights carrying a sliding eye-piece, a diaphragm back of the eye-piece having parallel slots, a standard tube behind one slot composed of a flat plate having a diagonally cut tube secured thereto along its cut portion so as to provide a longitudinal section of varying thickness, and a tube for the unknown solution movable with the eye-piece and located between the diaphragm and the flat plate carrying the standard solution tube.

4. A container for a colorimeter, comprising a plate and a tube, each of light transmitting material, the tube diagonally cut and secured along its cut portion to the plate so as to provide a longitudinal section of varying thickness.

5. A container for a colorimeter, comprising a glass plate and a glass tube, the latter diagonally cut and fused along its cut portion to the former so as to provide a longitudinal section of varying thickness.

6. A container for a colorimeter, comprising a translucent glass plate and a clear glass tube, the latter diagonally cut and fused along its cut portion to the former so as to provide a longitudinal section of varying thickness.

7. A colorimeter comprising a container of light transmitting material, an eyepiece in fixed relation thereto, a second container composed of diagonally cut tubing secured along its cut portion to a plate so as to provide a longitudinal section of varying thickness, said tubing and plate being of light transmitting material, a diaphragm interposed between said eyepiece and said containers, the diaphragm having slots to permit light to pass from the containers to the eyepiece, means for bringing the rays from each container adjacent each other at the eyepiece, and means for effecting relative movement between said eyepiece and said second container in a direction longitudinal to the latter so as to vary the effective thickness of the second container.

8. A colorimeter comprising a stand carrying a stationary opaque diaphragm having parallel longitudinal slots permitting light to pass therethrough, a pair of parallel tubes of light conducting material for holding the solutions to be tested being disposed respectively behind said slots, one of said tubes being tapered in longitudinal section to present a variable thickness to the light rays passing through the diaphragm, an eye piece movable in a direction parallel to said slots, and means for bringing the parallel bands of light passing through the diaphragm and transversing said respective tubes adjacent each other in the field of said eye piece.

Signed at New York City, in the county of New York and State of New York, this 18th day of August A. D. 1920.

ROBERT E. KLETT.